United States Patent [19]

Cline

[11] Patent Number: 4,782,457
[45] Date of Patent: Nov. 1, 1988

[54] BARREL SHIFTER USING BIT REVERSERS AND HAVING AUTOMATIC NORMALIZATION

[75] Inventor: James H. Cline, Allen, Tex.

[73] Assignee: Texas Instruments Incorporated, Dallas, Tex.

[21] Appl. No.: 897,700

[22] Filed: Aug. 18, 1986

[51] Int. Cl.$^4$ ............................................. G06F 7/00
[52] U.S. Cl. ............................... 364/715.04; 364/745; 364/900; 364/715.08
[58] Field of Search ................ 364/715, 900 MS File; 365/78; 377/67, 69; 364/748

[56] References Cited

U.S. PATENT DOCUMENTS

| | | | |
|---|---|---|---|
| 3,831,012 | 8/1974 | Tate et al. | 364/748 |
| 3,961,750 | 6/1976 | Dao | 364/900 |
| 4,181,976 | 1/1980 | Collins et al. | 364/900 |
| 4,396,994 | 8/1983 | Kang et al. | 364/900 |
| 4,472,788 | 9/1984 | Yamazaki | 364/900 |
| 4,488,252 | 12/1984 | Vassar | 364/748 |
| 4,583,197 | 4/1986 | Chappell et al. | 364/900 |
| 4,636,976 | 1/1987 | Takla | 364/900 |
| 4,665,538 | 5/1987 | Machida | 364/715 X |

OTHER PUBLICATIONS

Weinberger, "*Arithmetic Shift*", IBM Technical Disclosure Bull., vol. 19, No. 1, Jun. 1976, pp. 207-216.
Gersback, "*High-Speed Shifter Array*", IBM Technical Disclosure Bull., vol. 21, No. 4, Sept. 1978, pp. 1379-1380.
Gersback, "*Algebraic/Logical Shift Matrix*" Technical Disclosure, Bull., vol. 23, No. 1, Jun. 1980, pp. 120-122.
Barrett, "Universal Shifter", IBM Technical Disclosure Bull., vol. 26, No. 12, May 1984, pp. 6341-6343.

*Primary Examiner*—Gary V. Harkcom
*Assistant Examiner*—Tan V. Mai
*Attorney, Agent, or Firm*—James T. Comfort; Melvin Sharp; Thomas W. DeMond

[57] ABSTRACT

A barrel shifter for a floating point processing unit can be optimized by having an automatic normalization feature. A multi-stage shifting unit is employed with external circuitry to verify that only leading zeros would be shifted out before activating a given shifting stage. Bit reversers are also used on the input and the output side of the barrel shifter in order to minimize the size and complexity of the circuit while still allowing bi-directional shifting.

10 Claims, 2 Drawing Sheets

BARREL SHIFTER USING BIT REVERSERS AND HAVING AUTOMATIC NORMALIZATION

BACKGROUND AND SUMMARY OF THE INVENTION

Most small computer systems today do not include floating point arithmetic in the CPU. Instead it is commonly done with software at great expense in speed. External arithmetic coprocessors have been developed to overcome this speed problem, but introduce new problems in their development.

The present invention is directed toward a barrel shifter for a floating point arithmetic unit that uses the IEEE format for representing floating numbers. It is a binary format, and as a result, a great deal of shifting is required in calculations. This is a time consuming process using a conventional shift register technique.

It is an object of the invention to enhance the performance of the shifting operations required for floating point calculations.

It is another object of the invention to allow for shifts of an arbitrary number of bits in either direction.

The shifting processes involved in floating point arithmetic are required in two instances. The first of these occurs when numbers are first brought into the floating point arithmetic unit. These numbers must be aligned so that the decimal (binary) points align. This process involves right shifting the smaller number and is referred to as denormalization.

The second instance occurs after the answer is calculated. The answer must be realigned into a standard format which usually involves left shifting. This process is called normalization.

The barrel shifter of the present invention is designed to handle both normalization and denormalization problems at high speed. It operates in two modes, shifting and normalization. In the shifting mode, a 6 bit binary shift code is provided externally, and the BSN (Barrel Shifter Normalizer) will shift the data that many places. The direction of the shift may also be controlled. Conventional barrel shifters require a large number of gates to implement both left and right shifts. This is because the shifting stages are in essence duplicated. In contrast, the present invention allows the barrel shifter to only shift left. A bit reverser is placed before the barrel shifter and a bit reverser is placed after the output of the barrel shifter. As can be seen, bit reversing a number, shifting it left, and then bit reversing the output is the same as right shifting a number.

It is an object of the present invention to minimize the number of gates required to implement both left and right shifting.

In normalization mode, the barrel shifter/normalizer (BSN) automatically shifts the data until a 1 is in a predefined and fixed location in the data. In other words, leading zeros are automatically shifted out. A separate 6 bit output indicates how far the shift was. Simple barrel shifters have existed for a long time but they have not had the normalization capability.

It is therefore an object of the invention to allow automatic normalization with an output indicating the number of bits shifted.

This and other objects of the invention are achieved by a barrel shifter comprising:

a first bit reverser stage having a first input for a first plurality of data bits and a first output bus for a second plurality of data bits;

said first bit reverser stage selectively, in response to a first control signal, causing said first plurality of data bits to appear on said first output bus as said second plurality of data bits and reversing the order of said second plurality of data bits:

a shifting stage having a second input coupled to said first output bus for receiving said second plurality of data bits, and a second output bus for a third plurality of data bits;

said shifting stage selectively, in response to a second control signal, causing said second plurality of data bits to be shifted in a first direction and output as said third plurality of data bits on said second output bus;

a second bit reverser stage having a third input coupled to said second output bus for said third plurality of data bits, and a third output bus for a fourth plurality of data bits; and said second bit reverser stage selectively, in response to a third control signal, causing said third plurality of data bits to appear on said third output bus as said fourth plurality of data bits and reversing the order of said fourth plurality of data bits.

DETAIL DESCRIPTION

The shifting process involved in floating point arithmetic occurs at two places. When numbers are first brought in to the floating point arithmetic unit. They must be aligned so that the decimal (binary) points align. This process involves right shifting the smaller number and is referred to as denormalization. After the answer is calculated, it must be realigned into a standard format. This usually involves left shifting and is called normalization.

Denormalization is the simpler of the two processes. The exponents of the two numbers are compared and the difference is obtained. The fractional portion (the mantissa) of the smaller number must be right shifted by this amount. The shift value is thus independent of the mantissa and is known before the shifting process starts.

The present invention is directed toward a barrel shifter/normalizer (BSN) that is used in a floating-point coprocessor for a computer system. It is designed to facilitate high-speed right and left bit shifts. The BSN can also perform automatic normalization and this will be discussed later.

Figure 1:
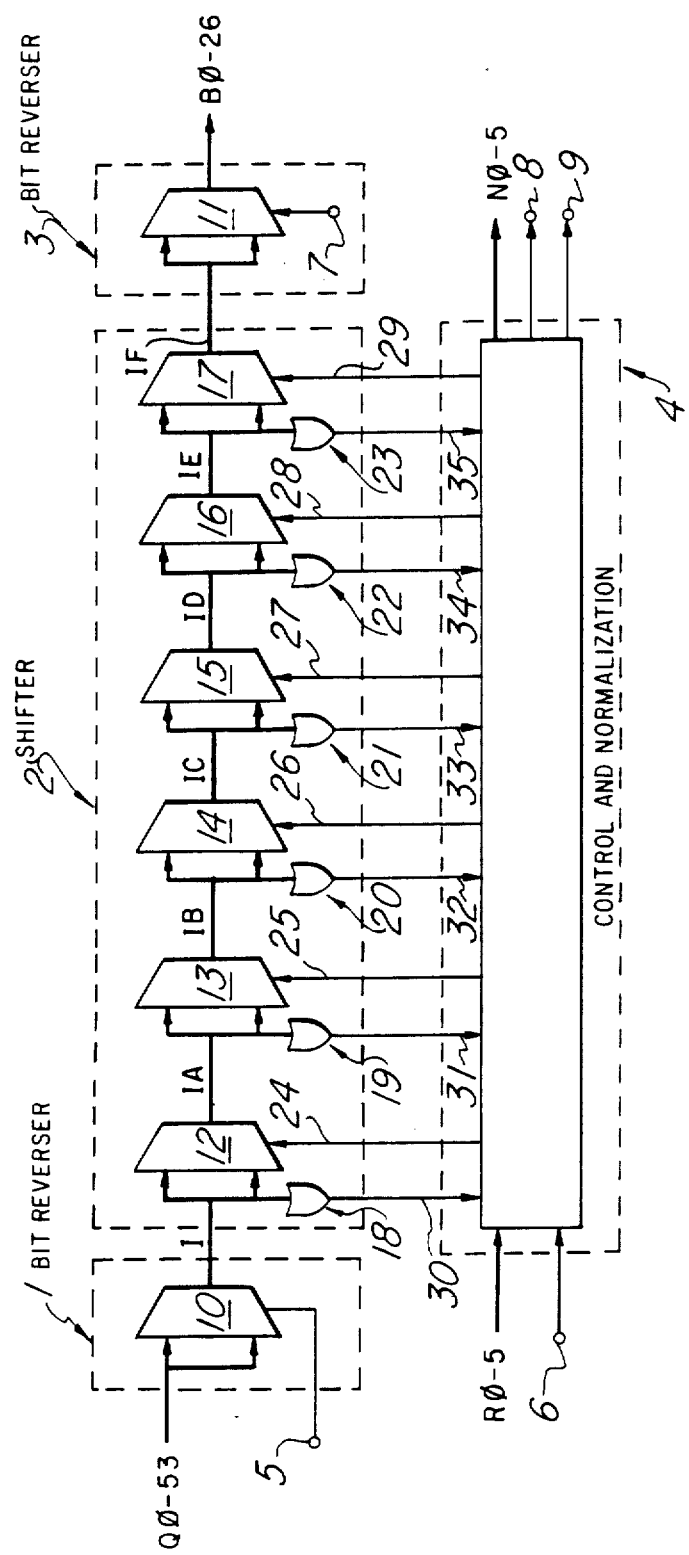
FIG. 1 is an overall block diagram of the preferred embodiment of a barrel shifter/normalizer employing the present invention.

FIG. 1 is a simplified schematic of the presently preferred embodiment of the invention. Blocks 1 and 3 are bit-reversers. Block 4 is the logic and control for the barrel shifter and the automatic normalization. Block 2 shows the barrel shifter.

The barrel shifter 2 is composed primarily of six shifting stages 12, 13, 14, 15, 16, and 17. Each stage can either shift the input data a fixed number of bits to the left, or pass the data through. Note that these stages cannot perform a right shift. The technique for performing right shifts will be discussed below.

Shift stage 12 receives input from data bus I and outputs data on data bus IA. It is controlled by control signal 24 generated by logic and control block 4. OR gate 18 samples the 32 most significant bits of data on data bus I and generates control signal 30. If control signal 24 is high, shift stage 12 will shift input data from data bus I 32 bits to the left and output the shifted data onto data bus IA. If control signal 24 is low, then shift stage 12 will pass the data on data bus I through to data bus IA.

Shift stage 13 receives input from data bus IA and outputs data on data bus IB. It is controlled by control signal 25 generated by logic and control block 4. OR gate 19 samples the 16 most significant bits of data on data bus IA and generates control signal 31. If control signal 25 is high, shift stage 13 will shift input data from data bus IA 16 bits to the left and output the shifted data onto data bus IB. If control signal 25 is low, then shift stage 13 will pass the data on data bus IA through to data bus IB.

Shift stage 14 receives input from data bus IB and outputs data on data bus IC. It is controlled by control signal 26 generated by logic and control block 4. OR gate 20 samples the 8 most significant bits of data on data bus IB and generates control signal 32. If control signal 26 is high, shift stage 14 will shift input data from data bus IB 8 bits to the left and output the shifted data onto data bus IC. If control signal 26 is low, then shift stage 14 will pass the data on data bus IB through to data bus IC.

Shift stage 15 receives input from data bus IC and outputs data on data bus ID. It is controlled by control signal 27 generated by logic and control block 4. OR gate 21 samples the 4 most significant bits of data on data bus IC and generates control signal 33. If control signal 27 is high, shift stage 15 will shift input data from data bus IC 4 bits to the left and output the shifted data onto data bus ID. If control signal 27 is low, then shift stage 15 wil pass the data on data bus IC through to data bus ID.

Shift stage 16 receives input from data bus ID and outputs data on data bus IE. It is controlled by control signal 28 generated by logic and control block 4. OR gate 22 samples the 2 most significant bits of data on data bus ID and generates control signal 34. If control signal 28 is high, shift stage 16 will shift input data from data bus ID 2 bits to the left and output the shifted data onto data bus IE. If control signal 28 is low, then shift stage 16 will pass the data on data bus ID through to data bus IE.

Shift stage 17 receives input from data bus IE and outputs data on data bus IF. It is controlled by control signal 29 generated by logic and control block 4. OR gate 23 samples the most significant bits of data on data bus IE and generates control signal 35. If control signal 29 is high, shift stage 17 will shift input data from data bus IE 1 bit to the left and output the shifted data onto data bus IF. If control signal 29 is low, then shift stage 17 will pass the data on data bus IE through to data bus IF.

Figure 2:
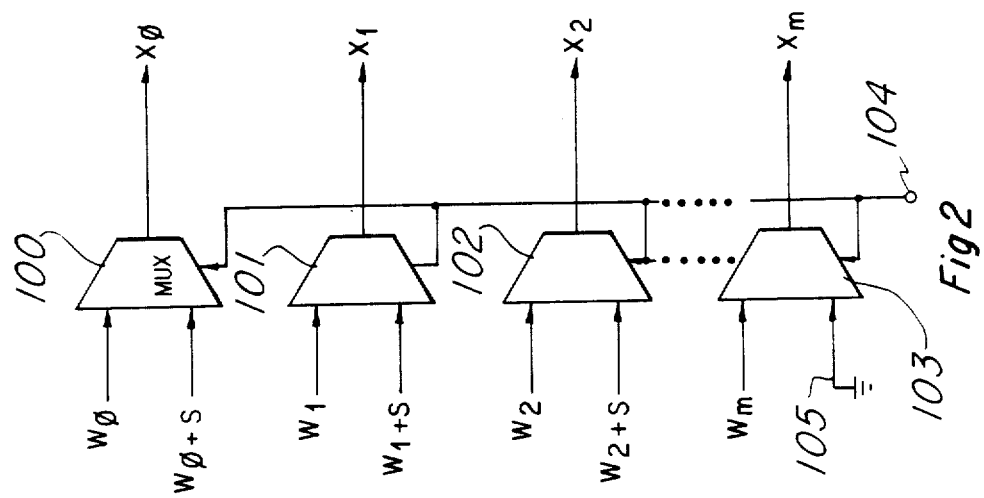
FIG. 2 is a more detailed view of a generalized shifting stage.

Each shifting stage in the preferred embodiment of the invention is composed of a series of 2 to 1 multiplexors (MUXs). Each MUX has two inputs for data, but only one output. A more detailed example of one embodiment is shown in FIG. 2. The MUXs are 100, 101, 102, . . . . , 103. The number of MUXs needed depends on the word width used for the shifting stage. In this example, the word width is M+1. The input data bus consists of lines W0 (0 is the high-order bit) through WM (M is the least significant bit). S is the amount of shift required. Assuming for example that the stage illustrated in FIG. 2 is to be an 8 bit shift, then S is equal to 8.

The inputs to MUX 100 are therefore lines W0 and W8. If control line 104 is high, then the data on line W8 is outputted onto line X0. If control line 104 is low, then data on W0 is passed to line X0. Each MUX works in a similar fashion. If the second input would be outside the range of the word width, then the input is grounded and will appear as a 0. This is shown at 105 as WM is the last line and the second input would be WM+8.

Referring back to FIG. 1, the inputs to control how many bit positions are to be shifted are lines R0 through R5 of logic and control block 4. Control line 6 is used to signify whether there is to be normal left shifting operations or automatic normalization. If control line 6 is low, then normal shift operations are to be performed.

Assuming that control line 6 is low, then control lines R0 through R5 are used by the logic and control block 4 to control the state of lines 24 through 29 respectively. That is to say that when R0 is high, then 24 is high thus activating the 32 bit shifter 12. If R1 is high, then 25 is high thus activating the 16 bit shifter 13, etc. In this fashion, left shifts from 0 (R0 through R5 being all zero) to 63 (R0 through R5) bit positions are possible. In the preferred embodiment, when control line 6 is low, then the data on lines N0–N5 is undefined (invalid).

Control and logic block 4 also uses the outputs 30–35 for OR gates 18–23 respectively to generate and output the IEEE guard and sticky bits on lines 8 and 9. The sticky bit is generated by control and logic block 4 ORing the data received on lines 30–35. Other logic circuitry takes care of guard bit.

As stated above, there is no provision in the barrel shifter 2 for right shifts. In conventional multi-stage barrel shifters that operate in both directions, two techniques are used. The first is to double the number of MUXs. This allows one set to operate for left shifts, and the other set to operate for right shifts. Disadvantages to this technique include the vastly increased circuit complexity (a minimum of twice the number of gates), routing problems for the various data buses, and double the number of control lines leading to the MUXs.

The other alternative conventional technique is to use 3 to 1 MUXs. Again there are the problems of routing complexity and additional control lines to each shifting stage. However the number of gates required goes up by a factor of 50% instead of doubling as in the previous technique.

In order to minimize these problems, the present invention uses two bit reversers 1 and 2 in FIG. 1. Mathematically, bit reversing a number, shifting left by N places, and then bit reversing the result is equivalent to right shifting the number by N positions. For example, if one wished to right shift a binary number by 5 places, then the steps are as follows.

1. First take the number as input:

1011011101111011

2. Bit reversing this number yields:

1101111011101101

3. Left shifting the number by 5 (and zero filling) gives:

110111011010000

4. Bit reversing the previous results in:

000001011011011

Figure 3:
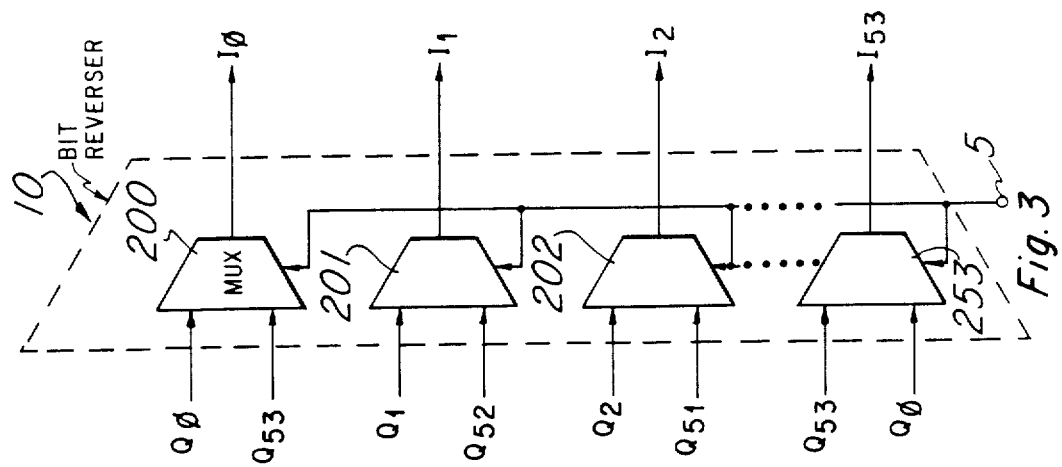
FIG. 3 is a detailed illustration of one of the bit reversers.

Bit reversers 1 and 2 are functionally identical. In the preferred embodiment of the invention, there is however a difference in the width as the entire BSN is designed with an input width of 54 bits and an output of 27 bits. FIG. 3 shows a more detailed drawing of bit reverser 1 of FIG. 1. As can be seen in FIG. 3, the structure of the bit reverser is similar to the structure of the shift stages discussed above. The multiplexor 10 is composed of a series of 2 to 1 MUXs 200, 201, 202, ..., and 253. Control signal 5 is used to control the operation of the MUXs. If control signal 5 is low, then data on line Q0 is passed to output data line I0, data on line Q1 is passed to line I1, data on line Q2 is passed to line I2, and so on to data on line Q53 being passed to line I53. If control signal 5 is high, then data on line Q53 is passed to output data line I0, data on line Q52 is passed to line I1, data on line Q51 is passed to line I2, and so on to data on line Q0 being passed to line I53. Therefore, as can been seen, if control signal 5 is high, then data on the Q input data bus is reversed coming out on the I data bus. If control signal 5 is low, then data on the Q bus is passed unchanged through the I bus.

Similarly, referring back to FIG. 1, control signal 7 controls the operation of the multiplexor 11 in bit reverser 3. If control signal 7 is low, then data coming in on data bus IF is passed through to output lines B0-B26 and if control signal 7 is high, then the data on bus IF is passed reversed to lines B0-B26.

In the presently preferred embodiment of the invention, control signals 5 and 7 are individually controlled so as to add to the flexibility of the BSN. In other embodiments, these control signals may be the same.

The second shifting process involved in floating point arithmetic is normalization. Normalization is more complex than denormalization. The mantissa must be left shifted until a 1 is in the left most digit of the result. This means that the shift value is dependent on the mantissa data and is not known before shifting begins. As the BSN is designed to handle both normalization and denormalization problems, it operates in either shifting or normalization mode. In the shifting mode, control line 6 of FIG. 1 is held low and a six bit binary shift code is provided on lines R0-R5. The BSN will then shift the data on lines Q0-Q53 that many places. The direction of the shift may also be controlled using control lines 5 and 7. This allows denormalization as well as simple left shifting to be performed.

For normalization mode, control line 6 is held high. This causes the BSN to automatically shift the data on lines Q0-Q53 until a 1 is in a predefined and fixed location in the data. In other words, leading zeros are automatically shifted out. Therefore the input R0-R5 is not recognized in this mode. Instead, a 6 bit output on lines N0-N5 indicates how far the shift was. The operation of this mode will now be explained.

Input data on lines Q0-Q53 is passed through MUX 10 onto data bus I. OR gate 18 ORs the data on the lines which would be shifted out if shifting stage 12 were to operate. Specifically, OR gate 18 ORs lines I0 through I31 as this is a 32 bit shift stage. Signal 30 is generated by OR gate 18. This will be a 1 if a 1 is on any of the lines I0-I31, and a 0 otherwise. If signal 30 is a 0, then there is nothing in the most significant bit positions of the data except zero and these should therefore be shifted out. This 0 on line 30 is input to the logic and control block 4. The logic and control block 4 causes a 1 to appear on line 24 and thus shifting stage 12 is activated causing the shifted data to appear on data bus IA. Of course if signal 30 is a 1, then the logic and control block 4 will cause a 0 to appear on line 24 and shift stage 12 will not shift. The data on data bus I will then be passed through to data bus IA. The logic and control block 4 also causes the value output on line 24 to appear in N0.

OR gate 19 samples the most significant 16 bits of data bus IA. If any of these data bits are a 1, then line 31 has a 1 and the logic and control block 4 will place a 0 on line 25 causing data on IA to appear unchanged on IB. If line 31 is low (i.e. 0), then line 25 is high (i.e. 1) and stage 13 shifts the data. The logic and control block 4 also causes the value output on line 25 to appear in N1.

OR gate 20 samples the most significant 8 bits of data bus IC. If any of these data bits are a 1, then line 32 has a 1 and the logic and control block 4 will place a 0 on line 26 causing data on IB to appear unchanged on IC. If line 32 is low then line 26 goes high and stage 14 shifts the data. The logic and control block 4 also causes the value output on line 26 to appear in N2.

OR gate 21 samples the most significant 4 bits of data bus IC and outputs the result on line 33. The logic and control block 4 will place the inverse on line 27 and N3. Shift stage 15 will either shift data on IC or cause the data to appear unchanged on ID.

In the same fashion, OR gates 22 and 23 sample either 2 or 1 bits on data bus ID and IE respectively. Control lines 34, 35,28, and 29 also work in similar a manner. The values on 28 and 29 appear on N4 and N5 respectively.

For normalization, control line 7 is held low (0) and so data appearing on data bus IF will be passed through to output lines B0-B26. Lines N0-N5 contain data representative of how many places the data was shifted before a 1 was placed in the desired location. This data will be valid only after the normalization has been performed. In this mode, data on lines R0-R5 is not used as the number of places to be shifted in unknown. Outputs 8 and 9 are also not used.

In the above discussions, reference has been made to the presently preferred embodiment of the invention. Modifications and enhancements to the structure shown, can be made by those skilled in the art without departing from the concepts disclosed. The scope of the present invention is therefore expressly not limited except as set forth in the accompanying claims.

What is claimed is:

1. A barrel shifter comprising: a first bit reverser stage having a first input for a first plurality of data bits and a first output bus for a second plurality of data bits;
  said first bit reverser stage selectively, in response to a first control signal, operative to output said first plurality of data bits in reverse order as said second plurality of data bits on said first output bus;
  a shifting stage having a second input coupled to said first output bus for receiving said second plurality of data bits, and a second output bus for a third plurality of data bits;
  said shifting stage selectively, in response to a second control signal, operative to shift said second plurality of data bits in a first direction and output as said third plurality of data bits on said second output bus;

a second bit reverser stage having a third input coupled to said second output bus for said third plurality of data bits and a third output bus for a fourth plurality of data bits; and said second bit reverser stage selectively, in response to a third control signal, operative to output said third plurality of data bits in reverse order as said fourth plurality of data bits on said third output bus.

2. The barrel shifter as claimed in claim 1 wherein said shifting stage is comprised of a plurality of parallel shifting segments coupled together in a series fashion.

3. The barrel shifter as claimed in claim 1 wherein said shifting stage is comprised of multiplexors.

4. The barrel shifter as claimed in claim 3 wherein said multiplexors are 2 to 1 multiplexors.

5. The barrel shifter as claimed in claim 1 wherein said firt bit reverser stage is comprised of multiplexors.

6. The barrel shifter as claimed in claim 1 wherein said second bit reverser stage is comprised of multiplexors.

7. An automatic normalization circuit having:

a multi-stage shifting mechanism comprising at least a first and second shifting stage;

said first shifting stage having a first input coupled to a first data bus having a first plurality of data lines, and a first output coupled to a second data bus having a second plurality of data lines;

said first shifting stage being coupled to a first control line wherein said first shifting stage selectively performs a shifting operation in response to a first control signal on said first control line;

said second shifting stage having a second input coupled to said second data bus;

said second shifting stage selectively performs a shifting operation in response to a second control signal;

a first OR circuit having inputs coupled to selected ones of data lines of said first data bus wherein said first OR circuit outputs a third control signal in response to data on said selected ones of data lines of said first data bus;

a second OR circuit having inputs coupled to selected ones of data lines of said second data bus wherein said second OR circuit outputs a fourth control signal in response to data on said selected ones of data lines of said second data bus;

a control circuit coupled to the output of said first OR circuit and in response to said third control signal generating said first control signal to effectuate control of said first shifting stage; and said control circuit being also coupled to the output of said second OR circuit and in response to said fourth control signal generating said second control signal to effectuate control of said second shifting stage.

8. The automatic normalization circuit as claimed in claim 7 wherein said first and second shifting stages are comprised of multiplexors.

9. The automatic normalization circuit as claimed in claim 8 wherein said multiplexors are 2 to 1 multiplexors.

10. The automatic normalization circuit as claimed in claim 7 wherein said control circuit generates an output readable by an external device; said output of said control circuit being representative of the state of said first and second control signals.

* * * * *